United States Patent
Wu et al.

(10) Patent No.: US 7,272,828 B2
(45) Date of Patent: Sep. 18, 2007

(54) SOFTWARE OBJECT TYPE IDENTIFICATION

(75) Inventors: Gansha Wu, Beijing (CN); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 10/306,535

(22) Filed: Nov. 27, 2002

(65) Prior Publication Data

US 2004/0103391 A1 May 27, 2004

(51) Int. Cl.
*G06F 9/45* (2006.01)
(52) U.S. Cl. ........................ 717/148; 717/144
(58) Field of Classification Search ............... 717/148, 717/144
See application file for complete search history.

(56) References Cited

U.S. PATENT DOCUMENTS

| | | | |
|---|---|---|---|
| 6,233,725 B1 * | 5/2001 | Beadle et al. ............... | 717/118 |
| 6,295,641 B1 * | 9/2001 | Beadle et al. ............... | 717/148 |
| 6,305,012 B1 * | 10/2001 | Beadle et al. ............... | 717/148 |
| 6,317,872 B1 * | 11/2001 | Gee et al. .................... | 717/152 |
| 6,324,687 B1 * | 11/2001 | Beadle et al. ............... | 717/148 |
| 6,336,213 B1 * | 1/2002 | Beadle et al. ............... | 717/136 |
| 6,530,075 B1 * | 3/2003 | Beadle et al. ............... | 717/114 |
| 6,557,023 B1 * | 4/2003 | Taivalsaari .................. | 718/1 |
| 6,637,025 B1 * | 10/2003 | Beadle et al. ............... | 717/148 |
| 6,684,393 B1 * | 1/2004 | Loen et al. .................. | 717/151 |
| 6,714,991 B1 * | 3/2004 | Bak et al. .................... | 719/316 |
| 6,901,588 B1 * | 5/2005 | Krapf et al. ................. | 717/164 |
| 6,996,804 B2 * | 2/2006 | Stoodley ...................... | 717/116 |
| 7,003,507 B2 * | 2/2006 | Tip et al. ..................... | 707/2 |
| 7,028,293 B2 * | 4/2006 | Ruf ............................. | 717/152 |

OTHER PUBLICATIONS

"Object-Oriented Compiler Construction", Jim Holmes, 1995, Chapters 1-8 and 12.*
Object-Oriented Information Systems, David A. Taylor, Apr. 10, 1992, Chapters 1,3,4,6 and 7.*
The Design and Evolution of C++, Bjarne Stroustrup, pp. 72-76, Mar. 9, 1994.*
Tuning JAVA Performance Fast Execution for Dynamic Languages, Paul Tyma, Dr. Dobbs, Apr. 1996, pp. 1-8.*
"The Design and Evolution of C++", Bjarne Stroustrup, Chapter 14 Casting, Mar. 9, 1994.*
"A Type System for Object Initialization In the Java Bytecode Language", Stephan N. Freund et al, ACM, 1998, pp. 310-327.*
"Principles of Object-Oriented Analysis and Design", James Martin, pp. 1-101, Jun. 1, 1992.*
"Method Lookup Strategies in Dynamically Typed Object-Oriented Programming Languages", Karel Driesen, Vruke University Brussel, 1993, Whole manual.*

(Continued)

*Primary Examiner*—Todd Ingberg
(74) *Attorney, Agent, or Firm*—Hanley, Flight & Zimmerman, LLC

(57) ABSTRACT

Methods and apparatus for identifying a type of a software object are disclosed. The methods and apparatus encode data associated with the software object based at least in part on the type of the software object and compare the encoded data with a value associated with a target object type to identify the type of the software object.

42 Claims, 6 Drawing Sheets

OTHER PUBLICATIONS

"Java Subtype Tests in Real-Time", Krzystol Palacz et al, pp. 1-26, Jul. 1995.*

JAVA!, Tim Richey, Chapters 1,2,6,7,13 and 14, Sep. 22, 1995.*

"A Type System for Object Initialization In the Java Bytecode Language", Stephan N. Freund et al, ACM 1998, pp. 310-327.*

The Art of Computer Programming Sorting and Searching, 1973, D, Knuth, pp. 406-407.*

Object-Oriented Analysis And Design with Applications, Second Edition, Grady Booch, Sep. 10, 1993, pp. 65-72, 121-123,342348,519.*

Sun Microsystems, Inc. "Java JIT Compiler Overview." Sun Microsystems, Inc. Support and Training. https://wwws.sun.com/software/solaris/jit. Original access date: Oct. 25, 2002.

Shiffman, H. "Boosting Java Performance: Native Code and JIT Compilers." Strategic Technologies, Silicon Graphics, Inc. http://www.disordered.org/Java-JIT.html. Original access date: Oct. 25, 2002.

Shiffman, H. "Java Grows Up: JNI, RMI, Beans and More." Strategic Technologies, Silicon Graphics, Inc. http://www.disordered.org/Java-At-One.html. Original access date: Oct. 25, 2002.

Palacz, K.; Vitek, J. "Java Subtype Tests in Real-Time." Proceedings of the 2004 ACM SIGPLAN European Conference on Object-Oriented Programming. Darmstadt, Germany, Jul. 2003. pp. 378-404.

* cited by examiner

Push target_type
push obj
call instanceof

FIG. 3 (PRIOR ART)

```
Boolean instanceof (Object, obj, Type target_type) {
    Type obj_type = obj.getType();
    if (obj_type == target_type)
        return true;
    return type_instanceof (obj_type, target_type);
}
```
⎫ 150

```
Boolean type_instanceof(Type obj_type, Type target_type){
    if (obj_type == target_type)
        return true;
    if (obj_type == ROOT_TYPE)
        return false;
    Type super_type = obj_type.get SuperType();
    if (type_instanceof (super_type, target_type))
        return true;
    for each super_intf in obj_type.getSuperInterfaces(){
        if (type_instanceof (super_intf, taget_type))
            return true;
    return false;
}
```
⎫ 152

```
            mov  R, HASHCODE(obj)
            cmp  R, UNDEFINED
            jne  do_the_check
            or   HASHCODE (obj),obj->vtable->type_bits_template
do_the_check and  R, TYPE_MASK(target_type)
            je   test_failure
```

FIG. 7

```
mov  R, HASHCODE(obj)
and  R, TYPE_MASK(target_type)
je   test_failure
```

FIG. 8

SOFTWARE OBJECT TYPE IDENTIFICATION

FIELD OF THE DISCLOSURE

The present disclosure relates generally to object-oriented programming and, more particularly, to software object type identification apparatus and methods.

BACKGROUND

Object-oriented programming often requires the execution of routines that identify the types of the objects that are to be instantiated during execution of a program. Often, it is necessary to determine the type of one or more software objects to guarantee that the objects will be compatible with the type assumption of the underlying hardware and/or software system that will use the objects.

Object type compatibility is particularly important for dynamic programming languages such as, for example, Java and C#, both of which are well-known dynamic programming languages. By way of background, dynamic programming languages such as Java and C# are not statically compiled into native machine code for execution on a particular hardware platform as are many static languages such as, for example, C++. Instead, dynamic programming language instructions are first compiled into bytecodes. The bytecodes are then transmitted (e.g., via the Internet) or otherwise conveyed to a target processing system, which interprets and/or just-in-time (JIT) compiles the bytecodes using a software application commonly referred to as a virtual machine.

A virtual machine acts as an execution engine that interposes or interfaces between the hardware platform and operating system of the target processing system and the bytecodes of the program to be executed by the target processing system. In this manner, any type of target processing system having virtually any type of hardware platform and operating system that can perform the functions of the virtual machine can execute the bytecodes making up the dynamic program. In other words, a virtual machine enables a program written in a dynamic language such as Java, for example, to become hardware platform and operating system independent.

Thus, programs are frequently written using a dynamic programming language to facilitate execution of the programs on a variety of hardware platforms and operating systems, some or all of which may not be known prior to compilation and execution of the programs. For example, many programs that are downloaded from web sites via the Internet are written using Java instructions that have been compiled into Java bytecodes. A target computer system (e.g., a computer system that is downloading the Java bytecodes for execution), can use a Java virtual machine to interpret and/or compile and execute the Java bytecodes, regardless of the specific hardware and operating system characteristics of the target computer system.

Regardless of whether a program is written using Java, C#, or some other program language, real-time compilation and execution of program instructions typically requires real-time type information (RTTI). RTTI is typically acquired by executing real-time software object type tests. In general, real-time software object type tests enable a virtual machine to determine the types of objects (as they are called for execution) during run-time or program execution. Some dynamic languages such as Java and C# provide explicit primitives or instructions to obtain RTTI. For example, Java provides instanceof, checkcast, and other primitives, whereas C# provides isinst, castclass, and other primitives. Unfortunately, to obtain RTTI, a substantial amount of object type information must be stored and processed during compilation or run-time, which consumes a substantial amount of processing time, system memory and/or register space.

BRIEF DESCRIPTION OF THE DRAWINGS

FIG. 3 is a program listing of an example Java-based program that may be executed by the processor system shown in FIG. 1 to invoke performance of the example software object type determination method shown in FIG. 2;

FIG. 4 is a program listing of an example Java-based program that can be executed by a Java virtual machine to carry out the software object type determination method shown in FIG. 2;

FIG. 7 is a program listing of an example manner in which the method shown in FIG. 6 can be implemented; and FIG. 8 is a program listing of an example method of determining software object type information that encodes object headers prior to run-time object type testing.

DETAILED DESCRIPTION

Figure 1:
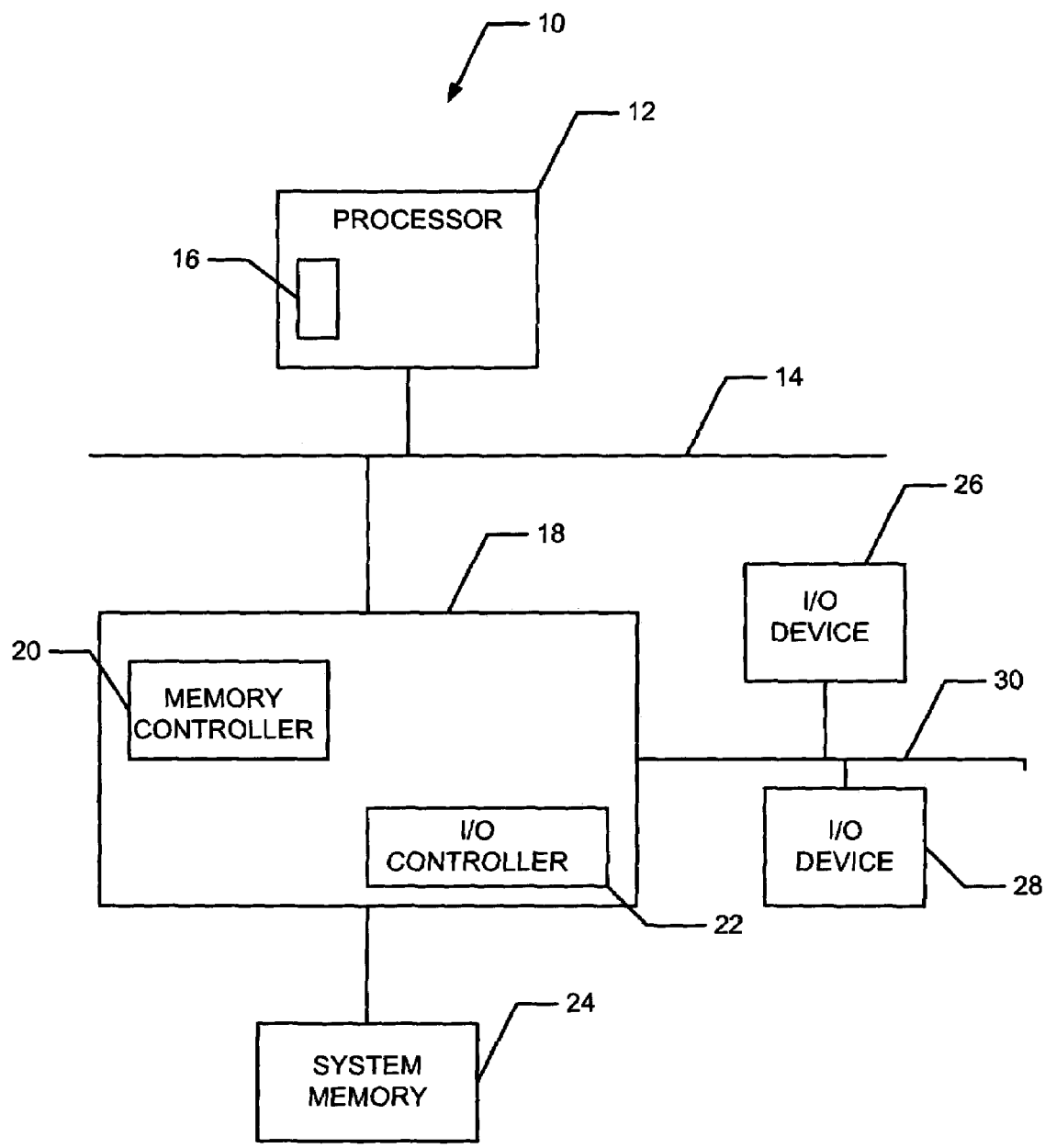
FIG. 1 is a block diagram of an example processor system that uses the apparatus and methods described herein.

FIG. 1 is a block diagram of an example processor system 10 that may be used to implement the apparatus and methods described herein. As shown in FIG. 1, the processor system 10 includes a processor 12 that is coupled to an interconnection bus or network 14. The processor 12 includes a register set or register space 16, which is depicted in FIG. 1 as being entirely on-chip, but which could alternatively be located entirely or partially off-chip and directly coupled to the processor 12 via dedicated electrical connections and/or via the interconnection network or bus 14. The processor 12 may be any suitable processor, processing unit or microprocessor such as, for example, a processor from the Intel Itanium™ family, Intel X-Scale™ family, the Intel Pentium™ family, etc. In the example described in detail below, the processor 12 is a thirty-two bit Intel processor, which is commonly referred to as an IA-32 processor. Although not shown in FIG. 1, the system 10 may be a multiprocessor system and, thus, may include one or more additional processors that are identical or similar to the processor 12 and which are coupled to the interconnection bus or network 14.

The processor 12 of FIG. 1 is coupled to a chipset 18, which includes a memory controller 20 and an input/output (I/O) controller 22. As is well known, a chipset typically provides I/O and memory management functions as well as a plurality of general purpose and/or special purpose registers, timers, etc. that are accessible or used by one or more processors coupled to the chipset. The memory controller 20 performs functions that enable the processor 12 (or processors if there are multiple processors) to access a system memory 24, which may include any desired type of volatile memory such as, for example, static random access memory (SRAM), dynamic random access memory (DRAM), etc. The I/O controller 22 performs functions that enable the processor 12 to communicate with peripheral input/output (I/O) devices 26 and 28 via an I/O bus 30. The I/O devices 26 and 28 may be any desired type of I/O device such as, for example, a keyboard, a video display or monitor, a mouse, etc. While the memory controller 20 and the I/O controller 22 are depicted in FIG. 1 as separate functional blocks within the chipset 18, the functions performed by these blocks may be integrated within a single semiconductor circuit or may be implemented using two or more separate integrated circuits.

Figure 2:
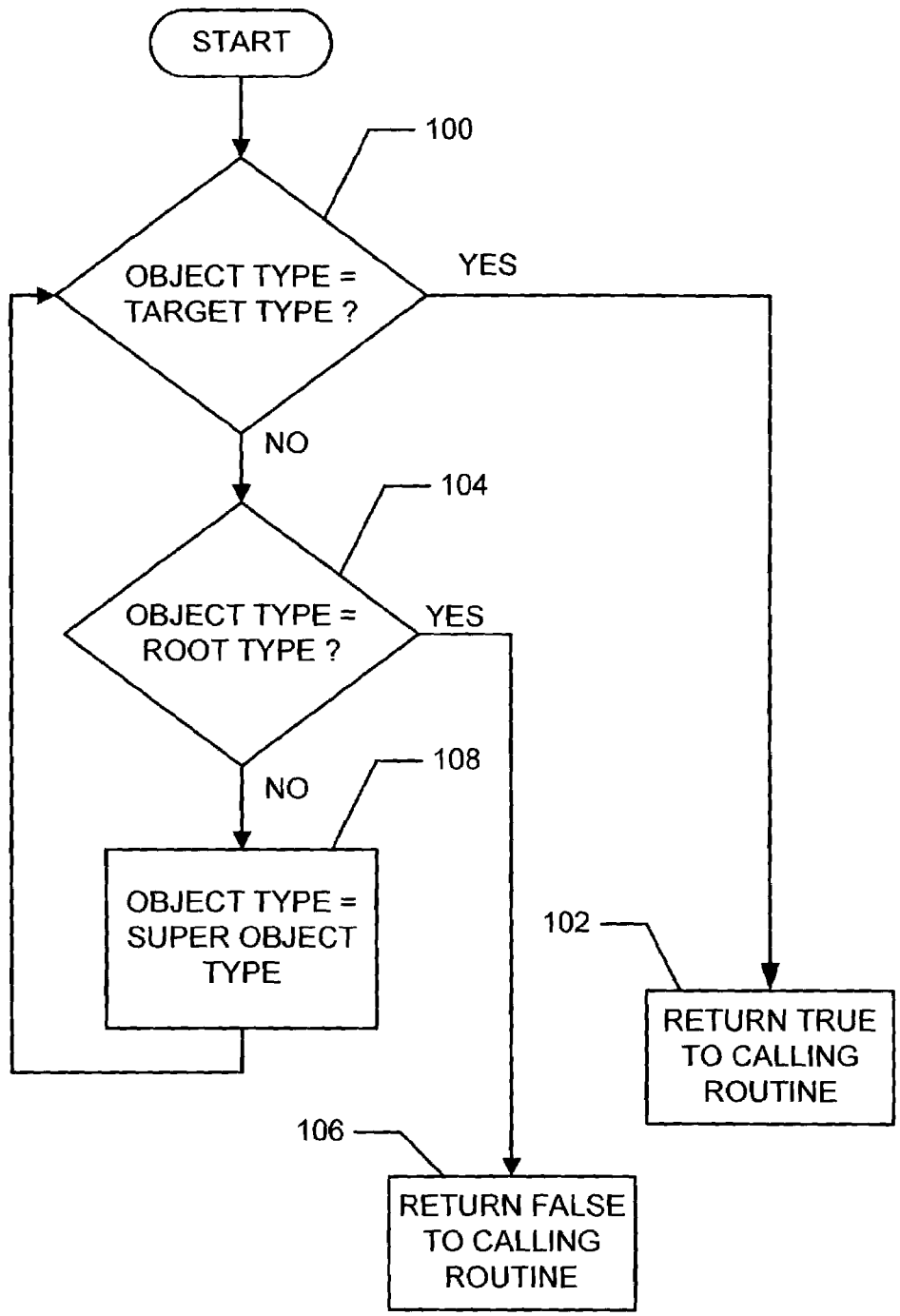
FIG. 2 is a flow diagram of an example of a known manner in which the system shown in FIG. 1 can be configured to determine software object type information.

FIG. 2 is a flow diagram of an example of a known manner in which the system 10 shown in FIG. 1 can be configured to determine real-time software object type information. As shown in FIG. 2, the processor 12 first determines if the type of the software object currently being executed by the processor 12 is equal to or identical to a canonical type or target object type (block 100). If the processor 12 determines that the type of the object currently being identified is equal to or identical to the target software object type (block 100), then the processor 12 returns a logical true (e.g., by setting a bit equal to one) to the routine or instructions that requested or called for real-time type information for the software object currently being identified (block 102).

On the other hand, if the processor 12, determines that the type of the object being identified is not identical or equal to the target type of object (block 100), then the processor 12 determines if the type of the object currently being identified is at a root level (i.e., is at a most general or highest level of an object hierarchy) (block 104). If the type of the object currently being executed is at a root level (block 104), then the processor 12 returns a logical false (e.g., by setting a bit equal to zero) to the routine or instructions that called for or requested the real-time type information for the object currently being identified (block 106). As is known, many object-oriented programming languages provide a well-defined root type within their object hierarchy. For example, Java provides a root type java.lang.Object and C# provides a root type System.Object. Thus, such defined root level types can be compared to the type of the object being identified to determine if the type of the object being identified is at a root level.

On the other hand, if the processor 12 determines the type of the object currently being identified is not at a root level, then the processor 12 sets the type for the object currently being identified to be identical to the super object type of that object (block 108), which is typically one level higher within the object hierarchy. After setting the type for the object currently being identified to its super object type, the processor 12 returns to block 100 to determine if the type for the object currently being identified is now equal to the target object type.

FIGS. 3 and 4 discussed in detail below, represent one manner in which the method shown in FIG. 2 can be implemented using Java-based programming techniques. Although a particular Java-based implementation of the example shown in FIG. 2 is described using an instanceof real-time type test, many other manners of implementing the method shown in FIG. 2 could be used instead. For example, the method shown in FIG. 2 is generally applicable to other real-time software object type tests based on other Java primitives such as checkcast and/or other programming languages such as C# and primitives such as castclass that are associated therewith.

Now turning to FIG. 3, a program listing of an example prior art Java-based program that may be executed by the processor 12 to call the real-time software object type determination method of FIG. 4 is shown. The Java-based instructions shown in FIG. 3 are first compiled into Java bytecodes which are, in turn, just-in-time compiled into native code (i.e., code which can be executed by the processor 12) by a Java virtual machine associated with the processor 12. The primitive instanceof which is called by the program shown in FIG. 3, is defined as shown below in Equation 1.

Boolean result=obj instanceof target_type        Equation 1

The variable target_type corresponds to a particular object type to be compared with the type of the object obj. As described in greater detail below, the call to instanceof results in execution of the function or routine instanceof (with the arguments obj and target _type) within the Java virtual machine associated with the processor 12.

The just-in-time compiler within the Java virtual machine interprets the call to the primitive instanceof as a call to the routine or program shown in FIG. 4. FIG. 4 is a program listing of an example prior art Java-based program that can be executed by a Java virtual machine (which may be executed by the processor 12) to carry out a real-time software object type determination in response to a request for RTTI by the program shown in FIG. 3. The program lines shown in FIG. 4 generally correspond to the blocks shown in FIG. 2. Thus, to better understand the example program listing shown in FIG. 4, references are made to the blocks shown in FIG. 2 throughout the description of FIG. 4.

When executed by the processor 12, a first set of program instructions 150 (which generally corresponds to blocks 100 and 102 of FIG. 2) cause the processor 12 to compare the type of the object currently being identified to the object type defined by target_type. If the processor 12 determines that the type of the object currently being identified is identical to the object type defined by target_type, then the program lines 150 cause the processor 12 to return a logical true to the routine shown in FIG. 3.

A second set of program instructions 152 (which generally corresponds to blocks 100-106 of FIG. 2) cause the processor 12 to determine if any of the super types of the object to be identified are compatible with the object type defined by target_type. If a super type of the object to be identified is found to be compatible with (i.e., identical to) the type of object defined by target_type, then a logical true is returned to the routine shown in FIG. 3. On the other hand, if the super_type reaches the root level and the root level is not compatible with target_type, then a logical false is returned to the routine shown in FIG. 3.

The second set of program instructions 152 represents an implementation that is somewhat different from the implementation generally depicted by the blocks 100-106 shown in FIG. 2. In particular, the second set of program instructions 152 results in recursive execution of the Boolean function type_instanceof, as opposed to an iterative loop such as that depicted in FIG. 2. In other words, as depicted in FIG. 4, the Boolean function type_instanceof calls itself, thereby enabling the routine shown in FIG. 4 to recursively progress through the super types of the object that is being compared to target_type.

A third set of program instructions 154 shown in FIG. 4 do not directly correspond to any of the blocks shown in FIG. 2. When executed by the processor 12, the third set of program instructions 154 cause the processor 12 to compare all of the super interfaces of the object being tested to the target type (i.e., to target_type). The third set of program instructions 154 are needed for situations in which the target_type is not a supertype of the object being tested and, thus, may be an interface type.

While the known techniques shown in FIGS. 2-4 enable a processor, such as the processor 12 shown in FIG. 1, to carry out real-time software object type tests, these techniques typically result in a substantial amount of processing overhead. In particular, the routine shown in FIG. 3 always calls the function instanceof, which is executed by a virtual machine associated with the processor 12. Unfortunately, such repeated function calls introduce a substantial amount of processing overhead within the virtual machine. Furthermore, for most calls to the instanceof function, the type of the object being identified is not identical to the target_type, which results in frequent loop iterations or recursive walks to determine if a super type of the object is compatible or identical to the type of the object. Still further, many commercial applications such as, for example, Jboss™ and Ecperf™, and many workloads such as, for example, J2EE and .NET, result in execution of the third set of program instructions 154 that result in a recursive walk through the super interface levels associated with the interface being tested.

Figure 5:
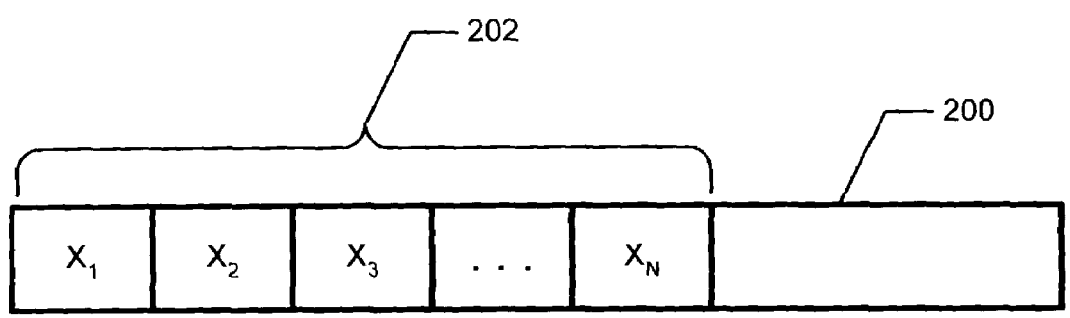
FIG. 5 is a diagrammatic view of an example manner in which an object header can be encoded based on the type of the object associated with the header.

FIG. 5 is a diagrammatic view of an example manner in which an object header 200 can be encoded based on the type of the object associated with the header 200 to enable rapid determination of object type during run-time. As shown in FIG. 5, a plurality of bit fields 202 within the header 200 is associated with a plurality of object types. In particular, each bit field within the plurality of bit fields 202 uniquely corresponds to a particular object type. For example, the first bit field $X_1$ may correspond to a first object type ($Type_1$), the second bit field $X_2$ may correspond to a second object type ($Type_2$), etc. The bit field corresponding to the type of the object to which the header is associated is set to a logical one, and all other bit fields corresponding to other object types are reset to a logical zero condition.

Preferably, the plurality of bit fields 202 defined in the header 200 correspond to frequently or commonly used or "hot types" of target objects such as, for example, the object types which are stored in the variable target_type. In particular, the well-known interfaces java.io.Serializable, java.rmi.Remote and java.lang.Clonable are frequently used target objects that are used in Java server side workloads and, thus, may be considered "hot types" for some applications. In any event, "hot types" are selected based on the nature of the workloads or applications executed by the processor 12. In other words, the frequency with which particular types of objects are used is a function of the types of workloads and/or applications that are executed. The particular encoding used (i.e., the bit or bits of the plurality of bit fields 202 that are set) to represent each of the target object types is defined in a configuration file or multiple configuration files that are stored within the memory 24 of the processor system 10. In some examples, the configuration files may be downloaded from a server or other processor system that is sending dynamic code (e.g., Java bytecodes) to the processor system 10. However, in other examples, the server or other processor system sending dynamic code may not send configuration files to the processor system 10 and the processor system may 10 instead assume default values, encodings, orbit patterns within the bit fields 202 for the different object types.

Regardless of the object types that are considered to be "hot types," the bit fields 202 in the header 200 are set for each object to identify the type of the object associated with the header 200. Preferably, as described above, a header portion (e.g., the header 200) of each object is encoded to identify the type of the object associated with the header 200. Specifically, a plurality of upper bits of the hashcode portion of each object is encoded as described above. Encoding of a portion of the hashcode of each object in the manner described herein does not impair the operation or efficiency of hashing operations.

While each bit within the bit fields 202 preferably has a unique or one-to-one correspondence with the frequently used or "hot types" of objects, more than one bit may be set to a logical one in a case where multiple inheritance is possible. For example, object systems based on Java or ECMA CLI allow an object type to inherit from or implement multiple interface types and, thus, one object may be compatible with multiple interface types. As a result, in these cases, more than one bit may be set within the object header 200 to reflect the compatibility of that object with multiple interface types. Furthermore, while the encoded information used to identify the object type for each object is described above as stored within the header 200 of each object, the information could instead be stored in a vtable, which is a well-known data structure in the object layout that contains the memory addresses of the actual code associated with the properties and methods implemented in the type of an object.

Figure 6:
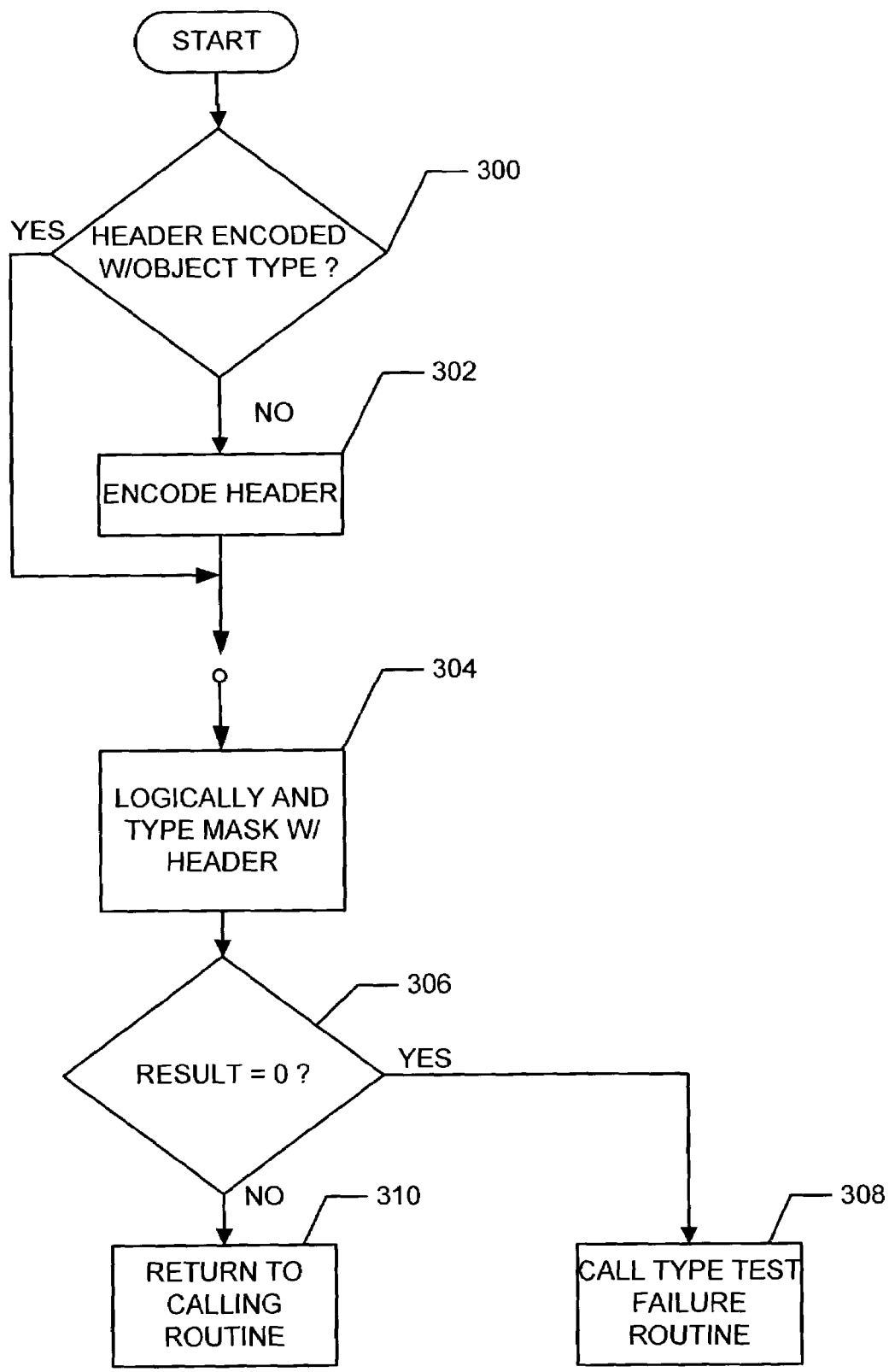
FIG. 6 is a flow diagram of an example of another manner in which the system shown in FIG. 1 can be configured to determine software object type information.

FIG. 6 is a flow diagram of an example manner in which the system 10 shown in FIG. 1 may be configured to perform an object identification type test by encoding and decoding the object header 200 shown in FIG. 5. FIG. 7 is a program listing (of just-in-time compiled code) of an example manner in which the method shown in FIG. 6 may be implemented. As shown in FIG. 6, the processor 12 first determines if the header of an object being type tested has been encoded (block 300). The determination at block 300 may be made as shown in the first two program lines of FIG. 7 by comparing the hashcode portion of the object being type tested (i.e., being identified) to a value or encoded condition associated with an undefined condition (i.e., a condition in which the hashcode portion of the object has not yet been encoded with object type information).

If the header of the object has not been encoded with object type information, the processor 12 encodes the header (block 302). As shown in FIG. 7, the object header (i.e., hashcode portion) may be encoded according to the fourth program line by logically ORing the hashcode portion of the object header with an object type template for that type of object. While the fourth program line of FIG. 7 indicates that the object type template information is stored in a vtable, it could instead be stored in any other data structure suitable for storing object information.

The encoding operations depicted in blocks 300 and 302 are executed for each object the first time that object is needed for execution. For subsequent uses of an object, the encoding operations depicted in blocks 300 and 302 do not have to be executed prior to execution of that object and, thus, these operations may be bypassed or otherwise not used.

To decode or determine the type of a previously encoded object, the processor 12 logically ANDs the type mask (i.e. the bit pattern or encoding) associated with the target type of object (block 304), which also corresponds to the fifth program line shown in FIG. 7. The processor 12 then determines if the result of the ANDing of the bit mask and the encoded header is equal to zero (which indicates that the object being type tested is not of the target type) (block 306). This determination corresponds to the sixth program line shown in FIG. 7. If the processor 12 determines that the result of the logical ANDing is equal to zero (i.e., the object being type tested is not of the target type), the processor 12 calls and executes type test failure or exception handling code (block 308), which may operate in a manner similar to that depicted in FIG. 2 or in some other desired manner. On the other hand, if the processor 12 determines that the result of the logical ANDing is not equal to zero (i.e., that the object being type tested is of the target type or is compatible with the target type), the processor 12 returns control to the routine that called for the type testing (block 310).

The example methods of testing object type shown in FIGS. 6 and 7 cause the processor 12 to encode the header for each object type during run-time. In other words, the first time an instanceof operation or the like is invoked, or the first time a hashcode is computed, the processor 12 must encode the header (i.e., a portion of the hashcode) for the object type associated with that instanceof operation and/or or that hashcode computation. To reduce run-time processing overhead at the expense of increased memory usage, the object headers (e.g., hashcodes) can be encoded at the time of object allocation. Using this technique, blocks 300 and 302 shown in FIG. 6 are not needed to perform an object type test during run-time. Instead, the object type test during run-time reduces to execution of blocks 304-308 shown in FIG. 6. FIG. 8 is a program listing of an example technique that is based on the encoding of object headers prior to run-time object type testing. As shown in FIG. 8, fewer program lines are needed to perform the object type testing as compared to the program listing shown in FIG. 7.

Although certain methods and apparatus have been described herein, the scope of coverage of this patent is not limited thereto. To the contrary, this patent covers all embodiments fairly falling within the scope of the appended claims either literally or under the doctrine of equivalents.

What is claimed is:

1. A method of identifying a type of a software object, comprising:
   receiving a software object;
   determining if the received software object contains encoded data representing the type of the software object, wherein the encoded data comprises a plurality of bits, and wherein there is a one-to-one correspondence between each of the bits and a plurality of predetermined target object types;
   encoding the received software object if no type of the software object is encoded therein; and
   comparing the encoded data with a value associated with one of the target object types to identify the type of the software object.

2. A method as defined in claim 1, wherein receiving the software object containing the encoded data includes receiving an object header containing the encoded data.

3. A method as defined in claim 2, wherein receiving the object header containing the encoded data includes receiving a hashcode containing the encoded data.

4. A method as defined in claim 2, wherein receiving the object header containing the encoded data includes receiving information stored in a vtable associated with the software object.

5. A method as defined in claim 1, further including generating the encoded data prior to a run-time type test of the software object.

6. A method as defined in claim 1, further including generating the encoded data during a run-time type test of the software object.

7. A method as defined in claim 1, further including generating the encoded data by logically combining an object type template with a portion of the software object.

8. A method as defined in claim 7, wherein logically combining the object type template with the portion of the software object includes logically ORing the object type template with a hashcode portion of the software object.

9. A method as defined in claim 1, wherein comparing the encoded data with the value associated with the one of the target object types to identify the type of the software object includes logically combining a type mask with a portion of the software object.

10. A method as defined in claim 9, wherein logically combining the type mask with the portion of the software object includes logically ANDing the type mask with a hashcode portion of the software object.

11. A method as defined in claim 1, further including non-recursively comparing the encoded data with the value associated with the one of the target object types to identify the type of the software object in response to a request to perform an object type test.

12. A method as defined in claim 11, wherein the request to perform an object type test includes a call to a primitive associated with an object-oriented programming language.

13. A method as defined in claim 1, wherein the software object is programmed in a dynamic programming language.

14. A method as defined in claim 13, wherein the dynamic programming language comprises at least one of Java or C#.

15. A method as defined in claim 1, wherein the software object comprises bytecodes.

16. A method as defined in claim 15, further comprising just-in-time compiling the bytecodes into machine specific instructions.

17. A method as defined in claim 16, wherein a virtual machine just-in-time compiles the bytecodes.

18. A method as defined in claim 1, further comprising at least one of returning the identified type of the software object to a calling routine or calling a failure routine.

19. A system for identifying a type of a software object, comprising:
   a processor; and
   a memory coupled to the processor and having instructions stored thereon that, when executed by the processor, cause the system to:
   receive a software object;
   determine if the received software object contains encoded data representing the type of the software object, wherein the encoded data comprises a plurality of bits, and wherein there is a one-to-one correspondence between each of the bits and a plurality of predetermined target object types;
   encode the received software object if no type of the software object is encoded therein; and
   compare the encoded data associated with the software object with a value associated with one of the target object types to identify the type of the software object.

20. The system of claim 19, further including instructions stored on the memory that, when executed by the processor, cause the system to generate the encoded data by encoding a header associated with the software object.

21. The system of claim 20, wherein the system encodes the header associated with the software object by encoding a hashcode associated with the software object.

22. The system of claim 20, wherein the system encodes the header associated with the software object by storing information in a vtable associated with the object.

23. The system of claim 19, further including instructions stored on the memory that, when executed by the processor, cause the system to generate the encoded data prior to a run-time type test of the software object.

24. The system of claim 19, further including instructions stored on the memory that, when executed by the processor, cause the system to generate the encoded data during a run-time type test of the software object.

25. The system of claim 19, further including instructions stored on the memory that, when executed by the processor, cause the system to generate the encoded data by logically combining an object type template with a portion of the software object.

26. The system of claim 25, wherein the system logically combines the object type template with the portion of the software object by logically ORing the object type template with a hashcode portion of the software object.

27. The system of claim 19, wherein the system compares the encoded data with the value associated with the one of the target object types to identify the type of the software object by logically combining a type mask with a portion of the software object.

28. The system of claim 27, wherein the system logically combines the type mask with the portion of the software object by logically ANDing the type mask with a hashcode portion of the software object.

29. The system of claim 19, further including instructions stored on the memory that, when executed by the processor, cause the processor to non-recursively compare the encoded data with the value associated with the one of the target object types to identify the type of the software object in response to a request to perform an object type test.

30. The system of claim 29, wherein the request to perform an object type test includes a call to a primitive associated with an object-oriented programming language.

31. A system as defined in claim 19, further comprising instructions stored on the memory that, when executed by the processor, cause the system to at least one of return the identified type of the software object to a calling routine or call a failure routine.

32. A machine readable medium having data stored thereon that, when executed by a processor, causes a system to:
receive a software object;
determine if the received software object contains encoded data that represents the type of the software object, wherein the encoded data comprises a plurality of bits, and wherein there is a one-to-one correspondence between each of the bits and a plurality of predetermined target object types;
encode the received software object if no type of the software object is encoded therein; and
compare the encoded data associated with the software object with a value associated with one of the target object types to identify a type of the software object.

33. The machine readable medium of claim 32, wherein the data stored thereon, when executed by the processor, causes the system to generate the encoded data by encoding a header associated with the software object.

34. The machine readable medium of claim 33, wherein the data stored thereon, when executed by the processor, causes the system to encode the header associated with the software object by encoding a hashcode associated with the software object.

35. The machine readable medium of claim 32, wherein the data stored thereon, when executed by the processor, causes the system to generate the encoded data prior to a run-time type test of the software object.

36. A machine readable medium as defined in claim 32, wherein the data stored thereon, when executed by the processor, causes the system to at least one of return the identified type of the software object to a calling routine or call a failure routine.

37. A system to identify a type of a software object, comprising:
a processor; and
a memory coupled to the processor and having instructions stored thereon that, when executed by the processor, cause the system to:
just-in-time compile bytecodes into native instructions associated with the processor that, when executed by the processor, cause the system to:
receive a software object;
determine if the received software object contains encoded data representing the type of the software object, wherein the encoded data comprises a plurality of bits, and wherein there is a one-to-one correspondence between each of the bits and a plurality of predetermined target object types;
encode the received software object if no type of the software object is encoded therein; and
compare the encoded data with a value associated with one of the target object types to identify the type of the software object.

38. The system of claim 37, wherein the native instructions, when executed by the processor, cause the system to generate the encoded data by encoding a header associated with the software object.

39. The system of claim 38, wherein the native instructions, when executed by the processor, cause the system to encode the header associated with the software object by encoding a hashcode associated with the software object.

40. A system as defined in claim 37, wherein the native instructions, when executed by the processor, cause the system to at least one of return the identified type of the software object to a calling routine or call a failure routine.

41. A method of identifying a type of a software object, comprising:
encoding data associated with the software object based at least in part on the type of the software object; and
comparing the encoded data with a type mask associated with a target object type to identify the type of the software object.

42. A method as defined in claim 41, wherein encoding the data associated with the software object includes encoding a header associated with the software object.

* * * * *